US008756217B2

(12) United States Patent
Peek

(10) Patent No.: US 8,756,217 B2
(45) Date of Patent: Jun. 17, 2014

(54) SPECULATIVE SWITCH DATABASE

(75) Inventor: Daniel Nota Peek, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 201 days.

(21) Appl. No.: 13/181,416

(22) Filed: Jul. 12, 2011

(65) Prior Publication Data

US 2013/0018919 A1   Jan. 17, 2013

(51) Int. Cl.
G06F 17/30 (2006.01)

(52) U.S. Cl.
USPC .......................................... 707/713; 707/721

(58) Field of Classification Search
USPC ................................................. 707/713, 721
See application file for complete search history.

(56) References Cited

U.S. PATENT DOCUMENTS

| | | | |
|---|---|---|---|
| 5,857,188 A * | 1/1999 | Douglas .............................. | 1/1 |
| 6,434,543 B1 * | 8/2002 | Goldberg et al. ............. | 707/802 |
| 6,615,221 B2 | 9/2003 | Warner et al. | |
| 6,772,363 B2 | 8/2004 | Pedone et al. | |
| 6,801,919 B2 | 10/2004 | Hunt et al. | |
| 7,206,162 B2 | 4/2007 | Semba et al. | |
| 7,490,162 B1 * | 2/2009 | Masters ........................ | 709/238 |
| 7,702,739 B1 | 4/2010 | Cheng et al. | |
| 8,069,469 B1 | 11/2011 | Atieh et al. | |
| 8,280,881 B1 | 10/2012 | Zhou et al. | |
| 2003/0204593 A1 * | 10/2003 | Brown et al. ................. | 709/225 |
| 2004/0215746 A1 | 10/2004 | McCanne et al. | |
| 2006/0053065 A1 | 3/2006 | Bowman | |
| 2007/0061329 A1 * | 3/2007 | Moutafov ....................... | 707/10 |
| 2007/0226276 A1 | 9/2007 | Suzuki | |
| 2007/0239713 A1 | 10/2007 | Leblang et al. | |
| 2008/0013720 A1 | 1/2008 | Melideo | |
| 2008/0033930 A1 | 2/2008 | Warren | |
| 2008/0320151 A1 | 12/2008 | McCanne et al. | |
| 2009/0138448 A1 * | 5/2009 | Barsness et al. ................. | 707/3 |
| 2009/0216718 A1 | 8/2009 | Agrawal et al. | |
| 2010/0185649 A1 | 7/2010 | Zhou et al. | |
| 2010/0217793 A1 * | 8/2010 | Preiss .......................... | 709/203 |
| 2012/0254155 A1 | 10/2012 | Heim et al. | |

OTHER PUBLICATIONS

"Speculative Execution in a Distributed File System", by Nightingale et al.. dated Oct. 26, 2005.*
Nightingale, et al. "Speculative Execution in a Distributed File System", 15 pages.
USPTO, *Office Action*, U.S. Appl. No. 13/181,388, filed Jul. 12, 2011, in re:Daniel Nota Peek; (20 pgs).
USPTO, *Office Action*, U.S. Appl. No. 13/181,396, filed Jul. 12, 2011, in re:Daniel Nota Peek; (11 pgs).

(Continued)

*Primary Examiner* — Mahesh Dwivedi
(74) *Attorney, Agent, or Firm* — Baker Botts L.L.P.

(57) ABSTRACT

Processing switch database operations may include receiving a database selection message from a database client, transmitting an unconditional acknowledgement to the database client in response to the database selection message, accessing a database query from a queue of queries from the a database client where the database query includes a user identifier and a database identifier, determining whether a matching backend database connection exists, and if a matching backend database connection exists, forwarding the database query to the matching backend database connection. In some embodiments, a matching backend database connection may be a backend database connection having a user identifier equivalent to the user identifier of the database query, and a database identifier that is equivalent to the database identifier the database query.

17 Claims, 5 Drawing Sheets

(56) References Cited

OTHER PUBLICATIONS

Wester, et al., "Tolerating latency in replicated state machines through client speculation", NSDI '09; 6th USENIX Symposium on Networked Systems Design and Implementation, 2009, pp. 245-260.
Nightingale, et al., "Rethink the Sync", 14 pages.
USPTO, *Office Action*, U.S. Appl. No. 13/181,388, filed Jul. 12, 2011, in re:Daniel Nota Peek; (23 pgs).
*USPTO Non-Final Office Action* for U.S. Appl. No. 13/181,405, 9 pages, Sep. 9, 2013.
*USPTO Final Office Action* for U.S. Appl. No. 13/181,388, 20 pages, Apr. 18, 2013.
*USPTO Final Office Action* for U.S. Appl. No. 13/181,388, 22 pages, Sep. 20, 2013.
USPTO Non-Final Office Action for U.S. Appl. No. 13/181,388, 24 pages, Oct. 25, 2012.
Response Pursuant to C.F.R. § 1.111 for U.S. Appl. No. 13/181,388, (9 pgs), Mar. 25, 2013.
Response Accompanying Request for Continued Examination (RCE) for U.S. Appl. No. 13/181,388, (9 pgs), Jun. 5, 2013.
Response Pursuant to C.F.R. § 1.111 for U.S. Appl. No. 13/181,388, (8 pgs), Sep. 12, 2013.
Notice of Appeal and Pre-Appeal Brief Request for Review, U.S. Appl. No. 13/181,388, (6 pgs), Dec. 20, 2013.
Response Pursuant to C.F.R. § 1.111 for U.S. Appl. No. 13/181,396, (8 pgs), Sep. 3, 2013.
USPTO Final Office Action for U.S. Appl. No. 13/181,396, 16 pages, Dec. 23, 2013.
Response Pursuant to C.F.R. § 1.111 for U.S. Appl. No. 13/181,405, (9 pgs), Dec. 9, 2013.

\* cited by examiner

SPECULATIVE SWITCH DATABASE

TECHNICAL FIELD

The present disclosure generally relates to databases and, more particularly to switching databases.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view web pages created or customized by other users where visibility and interaction with such pages by other users is governed by some characteristic set of rules.

Such social networking information, and most information in general, is typically stored in relational databases. Generally, a relational database is a collection of relations (frequently referred to as tables). Relational databases use a set of mathematical terms, which may use Structured Query Language (SQL) database terminology. For example, a relation may be defined as a set of tuples that have the same attributes. A tuple usually represents an object and information about that object. A relation is usually described as a table, which is organized into rows and columns. Generally, all the data referenced by an attribute are in the same domain and conform to the same constraints.

The relational model specifies that the tuples of a relation have no specific order and that the tuples, in turn, impose no order on the attributes. Applications access data by specifying queries, which use operations to identify tuples, identify attributes, and to combine relations. Relations can be modified and new tuples can supply explicit values or be derived from a query. Similarly, queries identify may tuples for updating or deleting. It is necessary for each tuple of a relation to be uniquely identifiable by some combination (one or more) of its attribute values. This combination is referred to as the primary key. In a relational database, all data are stored and accessed via relations. Relations that store data are typically implemented with or referred to as tables.

Relational databases, as implemented in relational database management systems, have become a predominant choice for the storage of information in databases used for, for example, financial records, manufacturing and logistical information, personnel data, and other applications. As computer power has increased, the inefficiencies of relational databases, which made them impractical in earlier times, have been outweighed by their ease of use for conventional applications. The three leading open source implementations are MySQL, PostgreSQL, and SQLite. MySQL is a relational database management system (RDBMS) that runs as a server providing multi-user access to a number of databases. The "M" in the acronym of the popular LAMP software stack refers to MySQL. Its popularity for use with web applications is closely tied to the popularity of PHP (the "P" in LAMP). Several high-traffic web sites use MySQL for data storage and logging of user data.

Using databases involves a series of messages that enable a database user to interact with a database. For example, a database transaction may involve messaging associated with setting up connections to a database, authentication, querying the database, switching databases, committing transactions to the database, and terminating connections with the database.

SUMMARY

In accordance with the present disclosure, disadvantages and problems associated with processing of switch database operations may be reduced or eliminated.

According to one embodiment, processing switch database operations may include receiving a database selection message from a database client, transmitting an unconditional acknowledgement to the database client in response to the database selection message, accessing a database query from a queue of queries from the a database client where the database query includes a user identifier and a database identifier, determining whether a matching backend database connection exists, and if a matching backend database connection exists, forwarding the database query to the matching backend database connection. In some embodiments, a matching backend database connection may be a backend database connection having a user identifier equivalent to the user identifier of the database query, and a database identifier that is equivalent to the database identifier the database query.

DESCRIPTION OF EXAMPLE EMBODIMENTS

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1A:
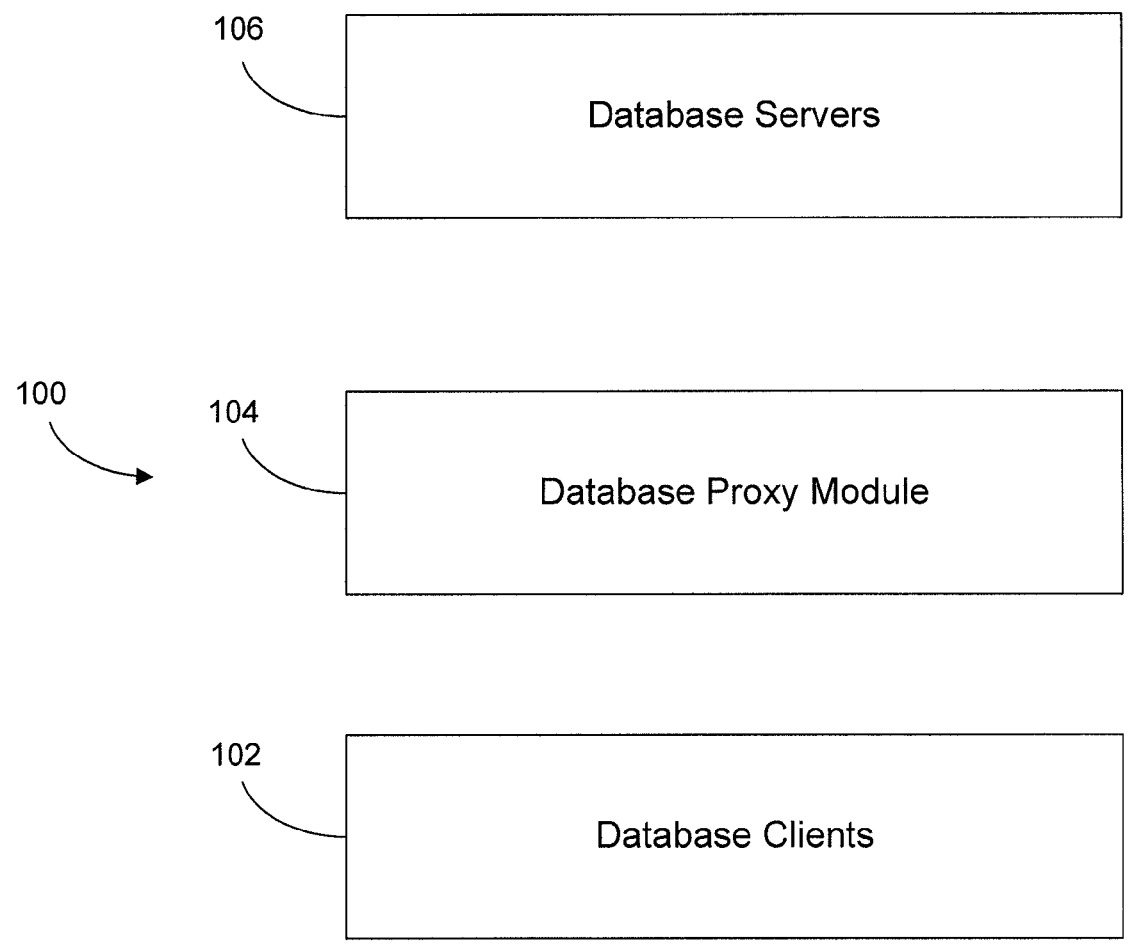
FIG. 1A illustrates example devices involved in a database transaction.

FIG. 1A illustrates a system 100 of example components involved in a database transaction. As illustrated, system 100 includes database clients 102, a database proxy module 104, and database servers 106. In appropriate environments, these components interoperate to facilitate database transactions between database clients 102 and a database server 106. For example, database clients 102 may transmit and receive messages from database server 106 using database proxy module 104, and thereby access, retrieve, and store information in a database residing on database server 106. The database proxy module 104 may facilitate and assist in the processing of database transactions between database clients 102 and database servers 106. In particular embodiments, database proxy module 104 is operable speculatively switch databases in a manner that conserves resources.

Figure 1B:
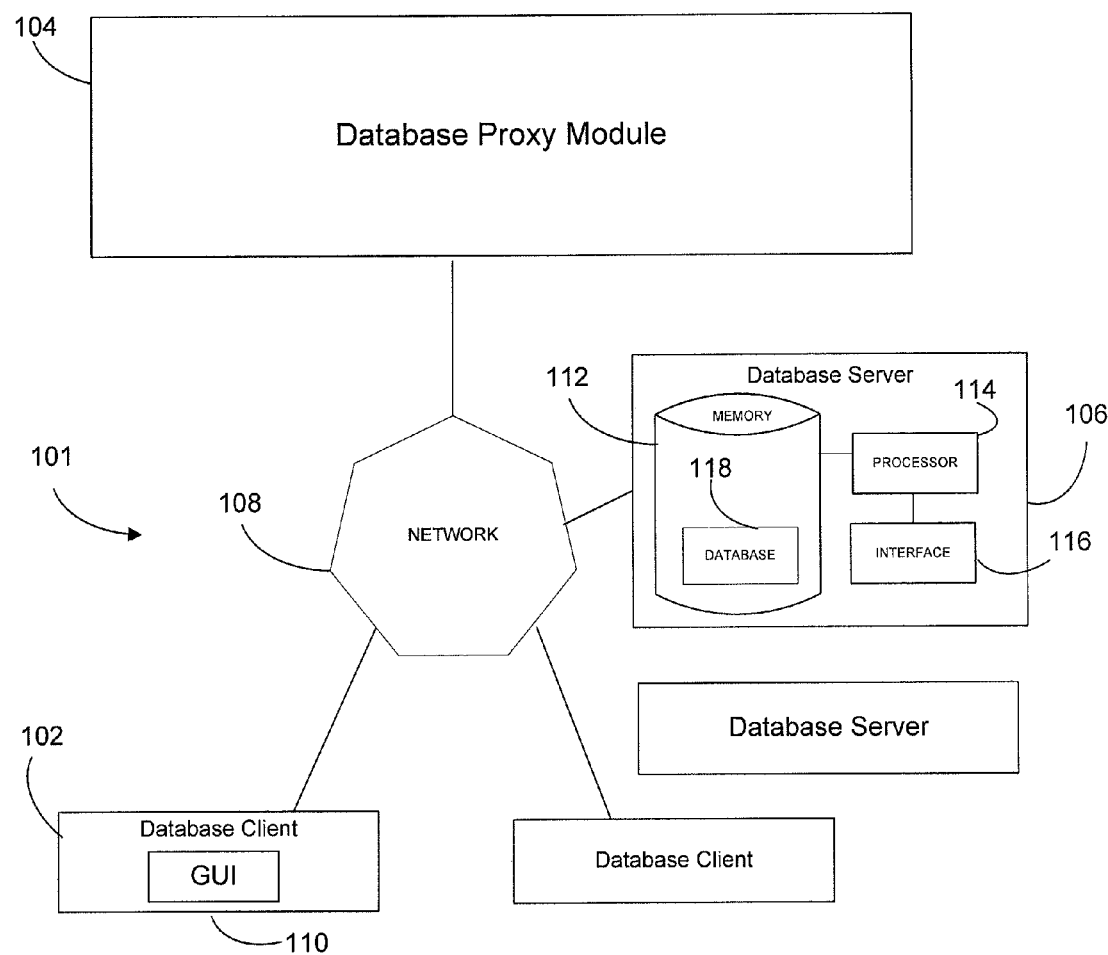
FIG. 1B illustrates an example database environment.

FIG. 1B illustrates a system 101 of an example database environment in which embodiments of the present disclosure may operate. In the illustrated embodiment, system 101 may speculatively switch databases using idle backend database connections to expedite database transactions. In particular embodiments, switching a database refers to the operation of altering the state and parameters associated with an existing database connection corresponding to a particular user and database. For example, database proxy module 104 may have a number of idle backend connections to various databases residing on database server 106. In particular embodiments, database proxy module 104 capitalizes on its knowledge of these backend connections to reuse them, as appropriate, to satisfy requests to select a database for the same or different user. In certain embodiments, a database connection is associated with a database identifier and a user identifier. A database identifier may uniquely identify a particular database on database server 106. A user identifier specifies a particular database client 102. In some embodiments, these parameters are included a use database message and/or a database query received from a database client 102. The illustrated system 101 facilitates speculative switching of databases in a manner that is efficient and avoids the processing and transactional overhead associated with communicating switch messages to database server 106, including switch user and/or switch database messages.

Database clients 102 represent computer systems including appropriate hardware, control logic, and data that may be used to interface with other system components, such as database proxy module 104 or database servers 106, using network 108. For example, database clients 102 may represent web servers, mainframe computers, workstations, laptops, netbooks, tablet computers, personal data assistants, (PDAs), mobile phones, mainframes, and any other suitable computing device capable of interacting with a database using appropriate messaging and/or database transactions. Database clients 102 may support a wide array of operations, including but not limited to, web browsing, word processing, querying databases, and processing results retrieved from databases. According to particular embodiments, database clients 102 may provide access, potentially through web-based interfaces, to information managed by other elements such as database proxy module 104 and database servers 106.

As illustrated, database clients 102 may include a graphical user interface 110. Graphical user interface 110 represents any appropriate interface for receiving and displaying information to a user of system 100. Graphical user interface 110 may be any appropriate combination of hardware and/or software to facilitate a user's interaction with database clients 102. In particular embodiments, database clients 102 are web servers that issue a series of database requests in order to deliver web pages to requesting network users. For example, a social networking user may request that a web server deliver a web page associated with another social networking user. In such an example, the web server may issue a number of database queries to populate the requested web page with relevant information. In some embodiments, the database queries issued by database clients 102 to database servers 106 may request the use of a database having the same user and/or database of an existing idle backend database connection between database proxy module 104 and database server 106. In those instances, those database queries may be processed efficiently by speculatively switching databases according to embodiments of the present disclosure.

Network 108 represents any suitable communications network operable to facilitate communication between the components of system 101, such as database clients 102, database servers 106, and database proxy module 104. Network 108 may include any interconnecting system capable of transmitting audio/video signals, data, messages or any other combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between components of system 101. Network 108 may include any combination of gateways, routers, hubs, switches, access points, base stations, wireless telephone systems and any other hardware, software or combination thereof.

Database proxy module 104 represents suitable hardware components, control logic, and data for processing database transactions to and from database servers 106 and database clients 102. As illustrated, database proxy module 104 may be communicatively coupled to other components of system 101, such as database servers 106 and database clients 102, by a network 108. Database proxy module 104 may receive requests to use a particular database of database server 106, respond to such requests unconditionally or without considerable processing, receive database queries, forward each query to database server 106, collect the results from each query, and forward the results to appropriate database client 102. In particular embodiments, database proxy module 104 is operable to expedite database transactions by database client 102 by reusing idle backend database connections having the same or similar parameters. Database proxy module 104 will be discussed in further detail in FIG. 2.

Database servers 106 represent suitable hardware components, control logic, and data for managing information in one or more databases. For example, database servers 106 may be any suitable combination of computer servers and networking devices, whether real or virtual. In particular embodiments, database servers 106 may manage data associated with a social networking website. For example, database servers 106 may manage data corresponding to users of a social networking website in the form of text, audio, video, and images. Database servers 106 may also retain information including configurations, settings, rules and policies associated with the managed data and/or particular users or groups. Database servers 106 may employ one or more relational databases for storing various types of information in a manner that is accessible and easily retrievable upon request.

As illustrated, database servers 106 may include various interconnected elements including a memory 112, a processor 114, and an interface 116. Memory 112 represents any suitable combination of volatile or non-volatile, local or remote devices suitable for storing information. For example, memory 112 may include random access memory (RAM), read only memory (ROM), magnetic storage devices, optical storage devices, or any other suitable information storage device or a combination of such devices. Memory 112 may maintain appropriate control logic and rules for controlling the operation of database servers 106. As illustrated, memory 112 may include a database 118 for storing and organizing various types of data. In particular embodiments, database 118 represents a relational database for storing information, such as social networking information, in an easily retrievable format. For example, database 118 may represent a SQL database for storing various types of information.

Processor 114 represents any hardware and/or software that communicatively couples to memory 112 and interface 116, and controls the operation and administration of database servers 106. For example, processor 114 may execute appropriate software to control the operation of database servers 106. Processor 114 may be a programmable logic device, a microcontroller, a microprocessor, any other appropriate processing device, or any suitable combination of the preceding.

Interface 116 represents any suitable device operable to receive information from network 108, transmit information through network 108, perform processing of received or transmitted information, communicate to other devices or any combination of the preceding. Interface 116 represents any port or connection, real or virtual including any suitable hardware and/or software including protocol conversion and data processing capabilities to communicate through a LAN, WAN or other communication systems that allow database servers 106 to exchange information with network 108, database clients 102 and database proxy module 104. For example, interface 116 may receive requests for database transactions associated with database 118 from database clients 102. According to particular embodiments, interface 116 may receive database queries from database clients 102 and/or database proxy module 104, for appropriate processing by processor 114 of the information stored in database 118 of memory 112.

In certain embodiments, database proxy module 104 maintains a pool of database connections between itself and one or more database servers located at one or more database servers 106. According to particular implementations, the database connections may be in an active or idle states with respect to particular databases at database servers 106. An active connection may refer to a database connection on which a result is expected to be returned. In particular embodiments, database proxy module 104 may harness a pool of database connections, as appropriate, to process and respond to database transactions received from database clients 102. For example, database proxy module 104 may multiplex database transactions received from different database clients 104 onto a particular database connection selected from the pool of database connections existing between database proxy module 104 and database servers 106. Thus, particular embodiments of the present disclosure facilitate using database connection pooling to improve the performance of database transactions.

In exemplary embodiments, database proxy module 104 receives various database messages from database clients 102, such as a request to use a particular database and queries to specific databases. Exemplary embodiments may unconditionally acknowledge database selection messages without considerable processing. Subsequent queries may be multiplexed onto any existing idle backend database connection having the same or similar parameters. The exemplary embodiment may also transmit messages to database server 106 as necessary to change one or more parameters associated with an idle backend connection before forwarding the database queries to database server 106, collecting any database results, and forwarding those results to the appropriate database clients 102.

Alternate embodiments may process database transactions other than queries while still employing the speculative database switching of the present disclosure. For example, database proxy module 104 may be configured to identify an idle backend connection with the same or similar parameters to a received database transaction other than a database query. A database transaction, such as a database query, may have a user identifier and a database identifier. A user identifier may uniquely identify a database client 102, while a database identifier may specify the desired database on database server 106. Using parameters such as the user identifier and the database identifier, database proxy module 104 may determine whether the same or similar idle backend database connections exist such that they may be reused to handle current or subsequent database transactions. Accordingly, database clients 102, database proxy module 104, and database servers 106 may work together to speculatively process database transactions that may require database switching.

A component of systems 100 and 101 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 100 and 101 and the components within systems 100 and 101.

While systems 100 and 101 are illustrated as including specific components arranged in a particular manner, it should be understood that various embodiments may operate using any suitable arrangement and collection of components capable of performing functionality such as that described. For example, a database server 106 may also be database proxy module 104.

Figure 2:
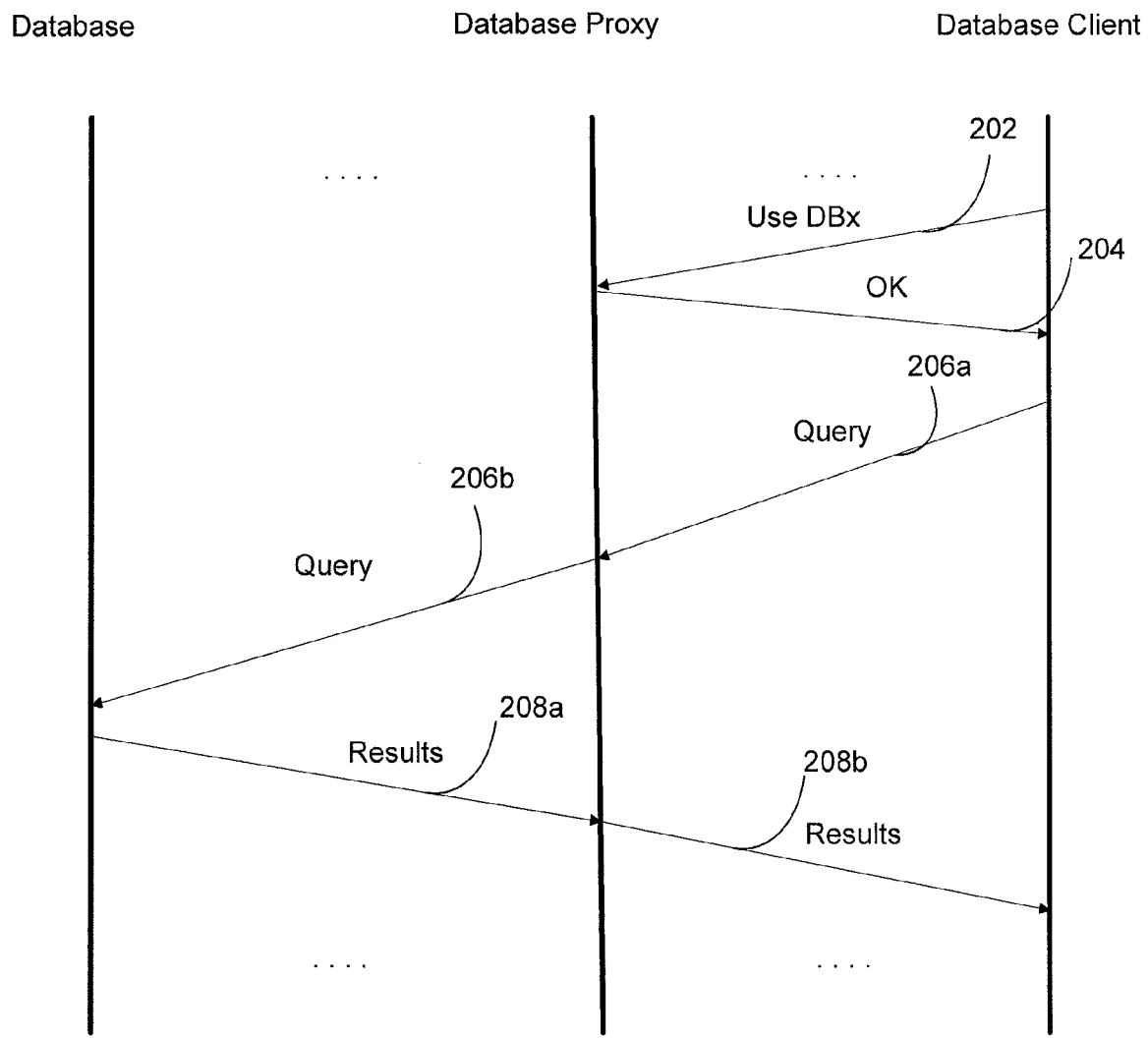
FIG. 2 illustrates a messaging sequence of an example embodiment.

FIG. 2 is a schematic diagram of an example messaging sequence 200 for speculatively switching a database. As illustrated, a database client 102 may issue a message to use a particular database. For example, database client 102 may transmit a use $DB_X$ message 202 to database proxy module 104. This message may specify to database proxy module 104 that database client 102 has the desire to use the database identified by 'X'. In response to the use $DB_X$ message 202, database proxy module 104 immediately responds with an acknowledgment message 204. In some embodiments, database proxy module 104 responds to use $DB_X$ message 202 unconditionally or automatically without substantial delay or considerable processing. In particular embodiments, database proxy module 104 transmits the acknowledgment message 204 without substantial delay or processing. For example, database proxy module 104 may speculate that database server 106 would have acknowledged the use $DB_X$ message 202 if it had received it.

Upon receiving the acknowledgment message 204, database client 102 may issue a number of requests to database proxy module 104. For example, database client 102 may issue a query message 206 to database proxy module 104 for forwarding to database server 106. As illustrated, query message 206 may represented by query messages 206a and 206b. In the illustrated embodiment, the database query message from database client 102 is illustrated as query message 206a and the forwarded database query from database proxy module 104 to database server 106 is illustrated as query message 206b. In certain embodiments, database proxy module 104 may determine whether an idle backend database connection exists having both the same user and logical database as requested by query 206a. If such an idle backend database connection exists, database proxy module 104 may forward the database query message 206 to that idle backend database connection. If a matching idle backend database connection does not exist, database proxy module 104 may determine whether a user connection limit for database client 102 has been exceeded. If the user connection limit is not exceeded, database proxy module 104 may determine whether an idle backend database connection exists having either a different user or a different logical database. If such a similar idle backend database connection exists, database proxy module 104 may change the user or the logical database as appropriate to match the received database query 206. In this manner, database proxy module 104 can reuse idle backend connection that it has with database server 106 and thereby conserve computing resources. If no idle backend database connection having either different user or logical databases found, database proxy module 104 may establish a new connection with database server 106 in order to process query 206. In certain embodiments, once the database switch is made and the query 206 is processed by database server 106, database proxy module 104 respond with corresponding results in database results message 208. As illustrated, database results message 208 may be represented by database results messages 208a and 208b. Once database proxy module 104 receives the database results in database results message 208a, it may forward the database results in a database results message 208b to database client 102.

As discussed, embodiments of the present disclosure may reuse idle backend database connections as appropriate to expedite database transactions with database server 106. While messaging sequence 200 has been illustrated as including specific types of messages arranged in a particular sequence, it should be understood that various embodiments may operate using any suitable arrangement collection of messages capable of providing functionality such as that described.

Figure 3:
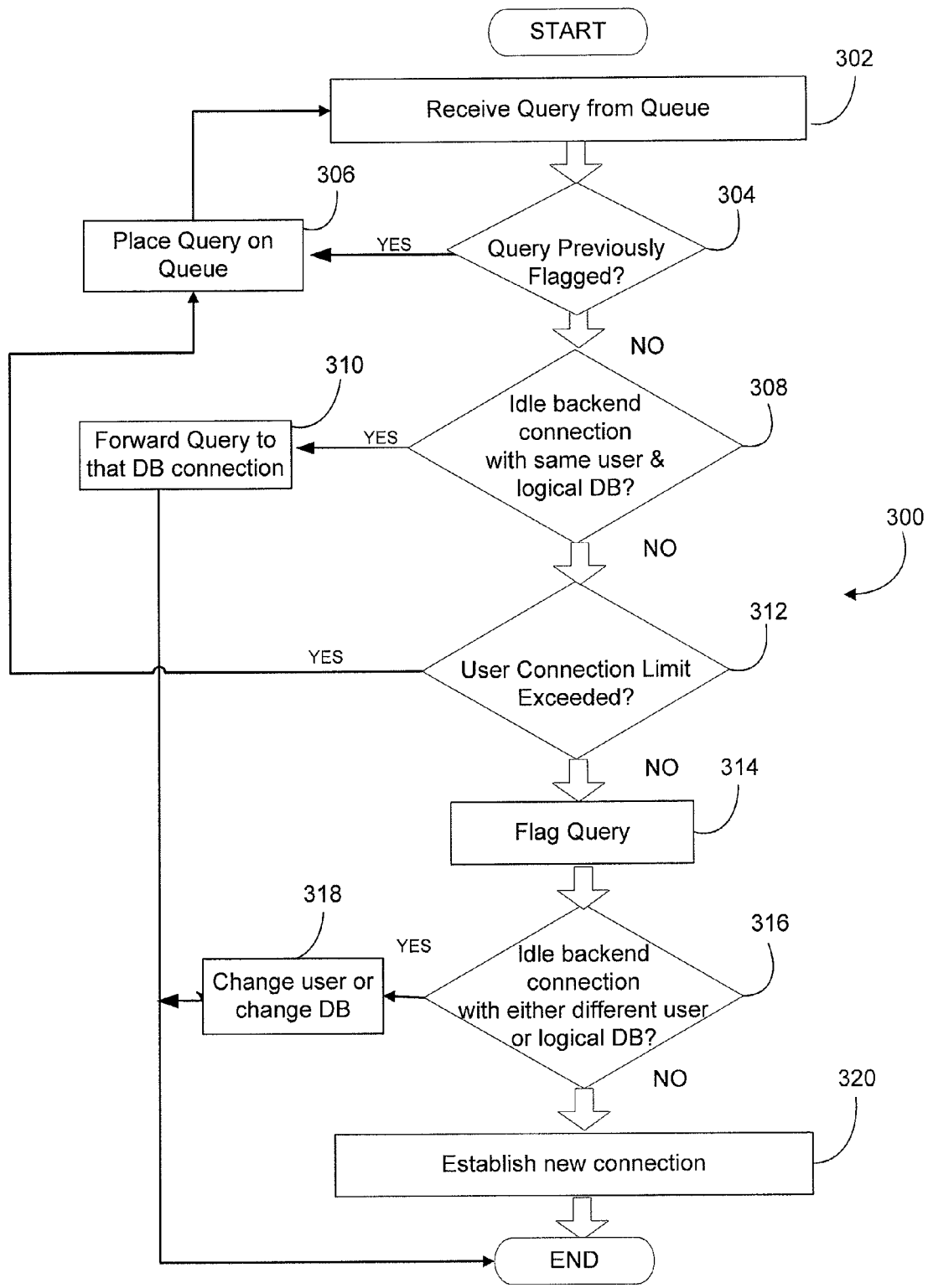
FIG. 3 illustrates a flowchart of an example embodiment.

FIG. 3 illustrates a flow chart of an example process flow 300 for speculatively switching a database. As illustrated, process flow 300 begins at step 302 when database proxy module 104 accesses a database query from a queue. As database queries are received, database proxy module 104 may insert those queries into a queue for processing. In particular embodiments, a queue is a data structure in a memory. Database queries placed in a queue can be accessed by database proxy module 104 as desired. Queues may enable database proxy module 104 to receive a number of database transactions while it waits for the results of earlier pending database transactions to complete with respect to database server 106. As discussed above, database proxy module 104 may receive a number of database queries following one or more database selection messages. In particular embodiments, those database selection messages are speculatively acknowledged by database proxy module 104 by transmitting an acknowledgment message without substantial delay after receiving the select database message. Next, in step 304, database proxy module 104 determines whether the query was previously flagged as having caused a database switch (i.e., steps 314-320). For example, if this query was previously received and caused a proxy module 104 to switch the user or logical database associated with an idle backend of its connection, the query may have been flagged. If the database query had been flagged, the database proxy module 104 places the query back on the queue in step 306. If the query was not flagged, process flow 300 continues to step 308. In step 308, database proxy module 104 determines whether an idle backend database connection exists having the same user and a logical database. In particular embodiments, such a determination may be made by comparing the user identifier and database identifies associated with the idle back end database connection and the received database query. If such an idle backend database connection exists, database proxy module 104 is operable to forward the database query to that idle database connection. If, however, no idle backend database connection exists having both the same user and the logical database, database proxy module 104 determines whether the user connection limit has been exceeded in step 312. If the limit has been exceeded, database proxy module 104 may place the query back on the queue in step 306. If the user connection limit has not been exceeded, database proxy module 104 may flag the query as having caused a database switch or a new connection in step 314.

The process flow 300 continues to step 316 where database proxy module 104 determines whether an idle backend database connection exists having either a different user or a logical database. As discussed above, this determination may be made by comparing the user identifier and database identifier associated with the idle backend database connection and the received database query and determining whether they are equivalent. If any matches are found, process flow 300 continues to step 318 to change the non-matching item. For example, if the user identifiers match, database proxy module 104 will issue a request to database server 106 to change the logical database. On the other hand, if the database identifiers match, then the database proxy module 104 may issue a request to database server 106 to change the user associated with the idle backend database connection. If, however, no idle backend database connection exists having either a different user or a different logical database, then process flow 300 continues to step 320 to establish a new database connection by transmitting an appropriate message to database server 106. As demonstrated, embodiments of the present disclosure are operable to reuse idle backend database connections having either the same user or logical database, or both. Such embodiments conserve transactional and processing resources by not issuing a new database transaction connection when an idle backend database connection can be reused.

While process flow 300 is illustrated as including specific steps arranged in a particular sequence, it should be understood that various embodiments may operate using any suitable arrangement and collection of steps capable of providing functionality such as that described. For example, in some embodiments, changing the user or database in step 318 may require more than an insignificant amount of processing time and the query may be placed on the queue as it waits for the first available and matching idle backend connection for processing the query.

Figure 4:
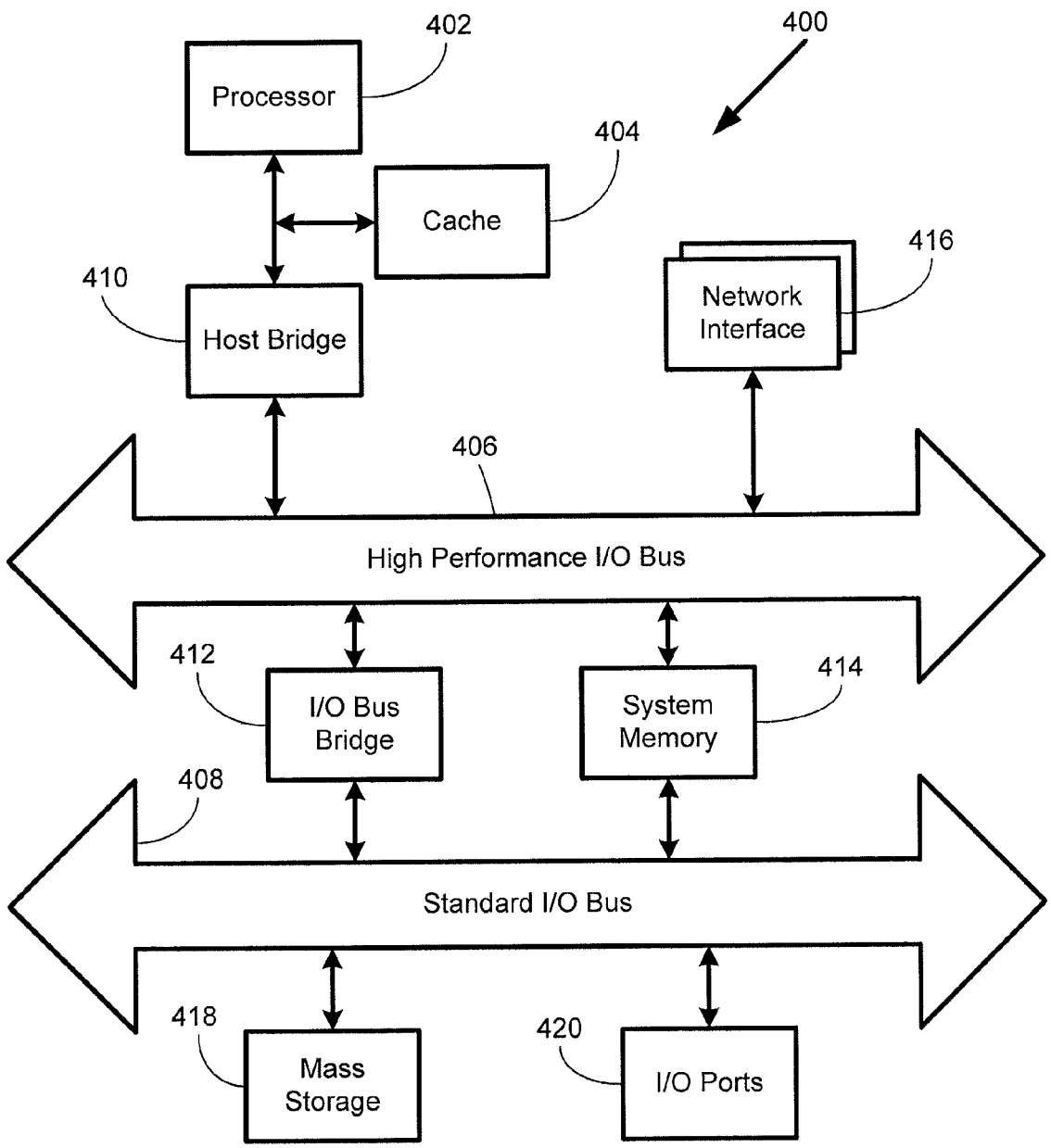
FIG. 4 illustrates an example computer system.

FIG. 4 illustrates an example computer system 400. In particular embodiments, computer system 400 is a computer server that runs all or part of a functionality related to a system for speculating switch database operations. In particular embodiments, computer system 400 may represent the hardware architecture of database clients 102, database proxy module 104, and/or database servers 106. In one embodiment, hardware system 400 includes a processor 402, a cache memory 404, and one or more software applications and drivers directed to the functions described herein. Additionally, hardware system 400 includes a high performance input/output (I/O) bus 406 and a standard I/O bus 408. A host bridge 410 couples processor 402 to high performance I/O bus 406, whereas I/O bus bridge 412 couples the two buses 406 and 408 to each other. A system memory 414 and a network/ communication interface 416 couple to bus 406. Hardware system 400 may further include video memory (not shown) and a display device coupled to the video memory. Mass storage 418 and I/O ports 420 couple to bus 408. In one embodiment, hardware system 400 may also include a keyboard and pointing device 422 and a display 424 coupled to bus 408. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 400 are described in greater detail below. In particular, network interface 416 provides communication between hardware system 400 and any of a wide range of networks, such as an Ethernet (e.g., IEEE 802.3) network. Mass storage 418 provides permanent storage for the data and programming instructions to perform the functions described herein, whereas system memory 414 (e.g., DRAM) provides temporary storage for the data and programming instructions when executed by processor 402. I/O ports 420 are one or more serial and/or parallel communication ports that provide communication between additional peripheral devices, which may be coupled to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain embodiments of the present disclosure may not require nor include all of the above components. For example, the peripheral devices shown coupled to standard I/O bus 408 may couple to high performance I/O bus 406. In addition, in some embodiments only a single bus may exist with the components of hardware system 400 being coupled to the single bus. Furthermore, hardware system 400 may include additional components, such as additional processors, storage devices, or memories.

In particular embodiments, the speculative switch database processing system, as well as other computer-implemented operations described herein includes a series of software routines run by hardware system 400. These software routines include a plurality or series of instructions to be executed by a processor in a hardware system, such as processor 402. Initially, the series of instructions are stored on a storage device, such as mass storage 418. However, the series of instructions can be stored on any suitable storage medium, such as a diskette, CD-ROM, ROM, or EEPROM. Furthermore, the series of instructions need not be stored locally, and could be received from a remote storage device, such as a server on a network, via network/communication interface 416. The instructions are copied from the storage device, such as mass storage 418, into memory 414 and then accessed and executed by processor 402.

An operating system manages and controls the operation of hardware system 400, including the input and output of data to and from software applications (not shown). The operating system provides an interface between the software applications being executed on the system and the hardware components of the system. According to one embodiment of the present disclosure, the operating system is the LINUX operating system. However, embodiments of the present disclosure may be used with other suitable operating systems, such as the Windows® 95/98/NT/XP/Vista/7 operating system, available from Microsoft Corporation of Redmond, Wash., the Apple Macintosh Operating System, available from Apple Computer Inc. of Cupertino, Calif., UNIX operating systems, and the like.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A non-transitory computer readable medium comprising instructions, the instructions operable when executed by a processor to:
   receive a database selection message from a database client;
   transmit an unconditional acknowledgement to the database client in response to the database selection message;
   access a database query from a queue of queries from the database client, the database query comprising a user identifier and a database identifier;
   determine whether a matching backend database connection exists, the matching backend database connection having a user identifier equivalent to the user identifier of the database query and a database identifier that is equivalent to the database identifier of the database query;
   if a matching backend database connection exists, forward the database query to the matching backend database connection; and
   determine, in response to determining that the matching backend database does not exist, whether a similar backend database connection exists, the similar backend database connection having a user identifier equivalent to the user identifier of the database query and a database identifier not equivalent to the database identifier of the database query, or having the user identifier not equivalent to the user identifier of the database query and the database identifier that is equivalent to the database identifier of the database query;
   if the similar backend database connection exists and the user identifier of the similar backend database connection is equivalent to the user identifier of the database query, transmit a request to a database server to switch the database identifier of the similar backend connection to the database identifier of the database query; and
   if the similar backend database connection exists and the database identifier of the similar backend database connection is equivalent to the database identifier of the database query, transmit a request to switch the user identifier of the similar backend database connection to the user identifier of the database query.

2. The non-transitory computer readable medium of claim 1, wherein the instructions are further operable when executed by the processor to, if the similar backend database connection does not exist, transmit a request to the database server to establish a new connection using the user identifier and database identifier of the database query.

3. The non-transitory computer readable medium of claim 1, wherein the request to the database server to switch the database identifier or switch the user identifier of the similar backend connection is transmitted when a user connection limit is not exceeded.

4. The non-transitory computer readable medium of claim 3, wherein the instructions are further operable when executed by a processor to identify the user identifier and the database identifier of the database query if the user connection limit is not exceeded.

5. The non-transitory computer readable medium of claim 4, wherein the instructions are further operable when executed by a processor to store the database query on the queue if the user identifier and the database identifier have been previously identified.

6. The non-transitory computer readable medium of claim 1, wherein if a user connection limit is exceeded, the database query is not processed.

7. An apparatus, comprising:
an interface for communicating database messages;
a memory for storing database messages;
a processor communicatively coupled the interface and the memory, the processor operable to:
receive a database selection message from a database client;
transmit an unconditional acknowledgement to the database client in response to the database selection message;
access a database query from a queue of queries from the database client, the database query comprising a user identifier and a database identifier;
determine whether a matching backend database connection exists, the matching backend database connection having a user identifier equivalent to the user identifier of the database query and a database identifier that is equivalent to the database identifier of the database query;
if a matching backend database connection exists, forward the database query to the matching backend database connection; and
determine, in response to determining that the matching backend database does not exist, whether a similar backend database connection exits, the similar backend database connection having a user identifier equivalent to the user identifier of the database query and a database identifier not equivalent to the database identifier of the database query, or having the user identifier not equivalent to the user identifier of the database query and the database identifier that is equivalent to the database identifier of the database query;
if the similar backend database connection exists and the user identifier of the similar backend database connection is equivalent to the user identifier of the database query, transmit a request to a database server to switch the database identifier of the similar backend connection to the database identifier of the database query; and
if the similar backend database connection exists and the database identifier of the similar backend database connection is equivalent to the database identifier of the database query, transmit a request to switch the user identifier of the similar backend database connection to the user identifier of the database query.

8. The apparatus of claim 7, wherein the processor is further operable to, if the similar backend database connection does not exist, transmit a request to the database server to establish a new connection using the user identifier and database identifier of the database query.

9. The apparatus of claim 7, wherein the request to the database server to switch the database identifier or switch the user identifier of the similar backend connection is transmitted when a user connection limit is not exceeded.

10. The apparatus of claim 9, wherein the processor is further operable to identify the user identifier and the database identifier of the database query if the user connection limit is not exceeded.

11. The apparatus of claim 10, wherein the processor is further operable to store the database query on the queue if the user identifier and the database identifier have been previously identified.

12. The apparatus of claim 7, wherein if a user connection limit is exceeded, the database query is not processed.

13. A method, comprising:
receiving a database selection message from a database client;
transmitting an unconditional acknowledgement to the database client in response to the database selection message;
accessing a database query from a queue of queries from the database client, the database query comprising a user identifier and a database identifier;
determining whether a matching backend database connection exists, the matching backend database connection having a user identifier equivalent to the user identifier of the database query and a database identifier that is equivalent to the database identifier of the database query;
if a matching backend database connection exists, forwarding the database query to the matching backend database connection; and
determining, in response to determining that the matching backend database not exist, whether a similar backend database connection exists, the similar backend database connection having a user identifier equivalent to the user identifier of the database query and a database identifier not equivalent to the database identifier of the database query, or having the user identifier not equivalent to the user identifier of the database query and the database identifier that is equivalent to the database identifier of the database query;
if the similar backend database connection exists and the user identifier of the similar backend database connection is equivalent to the user identifier of the database query, transmitting a request to a database server to switch the database identifier of the similar backend connection to the database identifier of the database query; and
if the similar backend database connection exists and the database identifier of the similar backend database connection is equivalent to the database identifier of the database query, transmitting a request to switch the user identifier of the similar backend database connection to the user identifier of the database query.

14. The method of claim 13, further comprising if the similar backend database connection does not exist, transmitting a request to the database server to establish a new connection using the user identifier and database identifier of the database query.

15. The method of claim 13, wherein the request to the database server to switch the database identifier or switch the user identifier of the similar backend connection is transmitted when a user connection limit is not exceeded.

16. The method of claim 15, further comprising identifying the user identifier and the database identifier of the database query if the user connection limit is not exceeded.

17. The method of claim 16, further comprising storing the database query on the queue if the user identifier and the database identifier have been previously identified.

\* \* \* \* \*